(12) United States Patent
Shostak

(10) Patent No.: US 9,817,809 B2
(45) Date of Patent: Nov. 14, 2017

(54) SYSTEM AND METHOD FOR TREATING HOMONYMS IN A SPEECH RECOGNITION SYSTEM

(75) Inventor: Robert E. Shostak, Portola Valley, CA (US)

(73) Assignee: VOCERA COMMUNICATIONS, INC., San Jose, CA (US)

( * ) Notice: Subject to any disclaimer, the term of this patent is extended or adjusted under 35 U.S.C. 154(b) by 932 days.

(21) Appl. No.: 12/389,762

(22) Filed: Feb. 20, 2009

(65) Prior Publication Data

US 2009/0216525 A1  Aug. 27, 2009

Related U.S. Application Data

(60) Provisional application No. 61/030,723, filed on Feb. 22, 2008.

(51) Int. Cl.
*G06F 17/27* (2006.01)

(52) U.S. Cl.
CPC .......... *G06F 17/271* (2013.01); *G06F 17/274* (2013.01)

(58) Field of Classification Search
CPC .............................. G10L 15/06; G10L 15/187
USPC ................. 704/275, 243, 255, 252
See application file for complete search history.

(56) References Cited

U.S. PATENT DOCUMENTS

| | | | |
|---|---|---|---|
| 8,010,343 B2* | 8/2011 | Agapi et al. ................... 704/10 |
| 2003/0009321 A1* | 1/2003 | Attwater et al. ................. 704/6 |
| 2006/0004571 A1* | 1/2006 | Ju et al. ......................... 704/243 |
| 2006/0025996 A1* | 2/2006 | Ju et al. ......................... 704/255 |
| 2006/0069563 A1* | 3/2006 | Ju et al. ......................... 704/252 |
| 2006/0136195 A1 | 6/2006 | Agapi et al. |
| 2007/0083359 A1 | 4/2007 | Bender |
| 2007/0118357 A1* | 5/2007 | Kasravi et al. ................. 704/10 |
| 2007/0225970 A1 | 9/2007 | Kady et al. |
| 2008/0133244 A1* | 6/2008 | Bodin et al. ................... 704/275 |

OTHER PUBLICATIONS

PCT/US09/34673, International Search Report, dated Jul. 7, 2009.
PCT/US09/34673, Written Opinion, dated Jul. 7, 2009.
PCT/US09/34673, International Preliminary Report on Patentability, dated Aug. 24, 2010.

\* cited by examiner

*Primary Examiner* — Richemond Dorvil
*Assistant Examiner* — Mark Villena
(74) *Attorney, Agent, or Firm* — DLA Piper LLP (US)

(57) ABSTRACT

A system and method for homonym treatment in a speech recognition system and method are provided. The system and method for homonym treatment in a speech recognition system may be used in a mobile wireless communication devices that are voice operated after their initial activation. The system may use a voice command interpreter to identify a correct interpretation for a received word that has one or more homonyms based on the received word and the one or more pieces of grammar for the word includes the inserted information about the one or more homonyms.

33 Claims, 9 Drawing Sheets

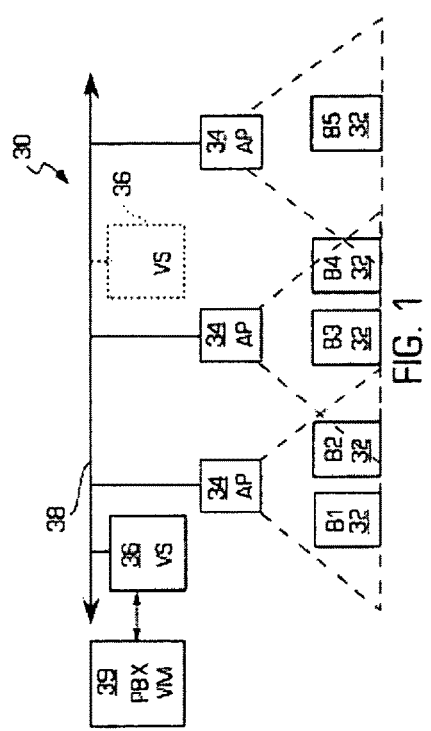
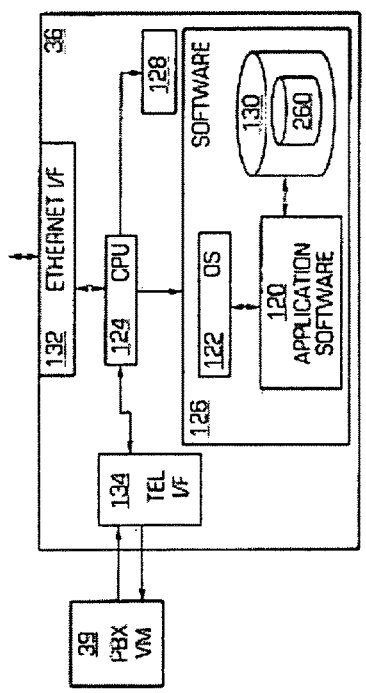
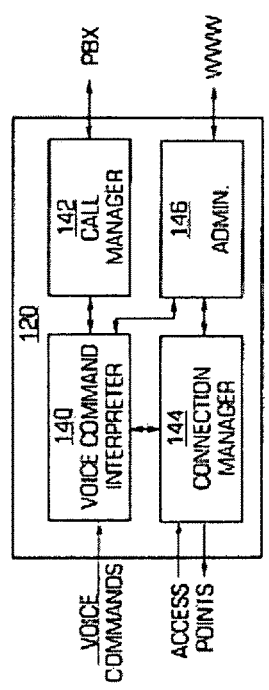

```
;GSL2.0
UserName: public
[
SpelledUserName: v {return($v)}
[((steve blair)] {return(u-sblair0)}
[((steve blair)] {return(u-sblair)}
]
SpelledUserName: public
[
[(s t e v e)(b l a i r)(s t e v e b l a i r)] {return(u-sblair0)}
[(s t e v e)(b l a i r)(s t e v e b l a i r)] {return(u-sblair)}
]
```

FIGURE 7

```
;GSL2.0
UserName: public
[
SpelledUserName: v {return($v)}
[((steve blair)(steve in radiology)(steve blair in radiology)] {return(u-sblair0)}
[((steve blair)(steve in nursing)(steve blair in nursing)] {return(u-sblair)}
]
SpelledUserName: public
[
[((s t e v e)(b l a i r)(s t e v e b l a i r)] {return(u-sblair0)}
[((s t e v e)(b l a i r)(s t e v e b l a i r)] {return(u-sblair)}
]
```

FIGURE 8

```
;GSL2.0
UserName: public
[
SpelledUserName: v {return($v)}
[(steve blair)(steve in radiology)(steve blair in radiology)] {return(u-sblair0)}
[(steve blare)(steve in transport)(steve blare in transport)] {return(u-sblare)}
[(steve blair)(steve in nursing)(steve blair in nursing)] {return(u-sblair)}
]
SpelledUserName: public
[
[(s t e v e)(b l a i r)(s t e v e b l a i r)] {return(u-sblair0)}
[(s t e v e)(b l a r e)(s t e v e b l a r e)] {return(u-sblare)}
[(s t e v e)(b l a i r)(s t e v e b l a i r)] {return(u-sblair)}
]
```

FIGURE 9

```
;GSL2.0
UserName:public
[
SpelledUserName:v {return($v)}
[(steve blair)(steve blare)(steve in radiology)(steve blair in radiology)] {return(u-sblair0)}
[(steve blair)(steve blare)(steve in transport)(steve blare in transport)] {return(u-sblare)}
[(steve blair)(steve blare)(steve in nursing)(steve blair in nursing)] {return(u-sblair)}
]

SpelledUserName:public
[
[(s t e v e)(b l a i r)(s t e v e b l a i r)] {return(u-sblair0)}
[(s t e v e)(b l a r e)(s t e v e b l a r e)] {return(u-sblare)}
[(s t e v e)(b l a i r)(s t e v e b l a i r)] {return(u-sblair)}
]
```

FIGURE 10

SYSTEM AND METHOD FOR TREATING HOMONYMS IN A SPEECH RECOGNITION SYSTEM

PRIORITY CLAIMS

This application claims the benefit, under 35 USC 119(e), to U.S. Provisional Patent Application Ser. No. 61/030,723 filed on Feb. 22, 2008 entitled "A system and method for name disambiguation and homonym recognition" which is incorporated herein by reference.

FIELD

A system and method for correctly distinguishing among multiple possible names in a speech recognition system is provided.

BACKGROUND

Various different speech recognition systems are well known and form a large part of our everyday lives. Examples of the well known speech recognition systems include systems for determining airline flight information, systems for accessing billing information, systems for providing directory assistance, systems for allowing service activation, and systems for navigating through a branching tree of possible choices in a customer contact center. Each of these systems processes an utterance by matching it with a single interpretation in the set of all possible interpretations. The set of all possible interpretations of an utterance will be referred to as the "recognition space." Note that the recognition space in a speech recognition system is always finite.

All speech recognition systems require an accurate interpretation of an utterance to perform an appropriate action; however, speech recognition systems are not foolproof and use probabilities to determine the likeliness of each possible utterance interpretation. A number of factors affect speech recognition accuracy, including the phonetic distinctiveness of items in the recognition space, the ability of system users to dynamically change the recognition space, the accent of a person issuing an utterance, simple mispronunciations, and so on. Each of these factors is greatly affected by the size of the recognition space. A large recognition space increases the likelihood of confusability and causes all of the factors that impact speech recognition to become severe problems.

One example of a potentially very large recognition space is a directory of user names, which can exist when a communications system has a large number of users who rely on voice commands to contact each other. This problem grows as the communications system itself grows, effectively providing a limit to the continued success of the system. All communications systems, such as telephones or fax machines, become more useful as more people employ them. When a communications system with a spoken user directory acquires a large number of users, however, the size of the directory itself limits the effectiveness of the system, because it significantly reduces the accuracy of speech recognition.

A speech recognition system would realize a significant benefit by being able to find accurate interpretations of similarly spelled or sounding names in a large recognition space, especially when one or more of the following situations occur: entries in the recognition space change dynamically and/or the recognition space contains entries that are not phonetically distinctive.

BRIEF DESCRIPTION OF THE DRAWINGS

FIG. 1 depicts an example of a voice-controlled wireless communications system that may utilize a speech recognition homonym treatment unit;

FIG. 2 is a block diagram of a controlling computer shown in FIG. 1;

FIG. 3 is a block diagram of the application software component of the controlling computer shown in FIG. 2;

FIG. 7 illustrates an example of the grammar of the speech recognition engine in which ambiguity exists that cannot be resolved; and FIG. 8 illustrates an example of the operation of the speech recognition grammar that contains the name disambiguation information; and FIG. 9 illustrates an example of the grammar of the speech recognition engine in which homonyms exist that cannot be resolved; and FIG. 10 illustrates an example of the operation of the speech recognition grammar that contains the homonym ambiguation information generated by the homonym treatment mechanism shown in FIG. 6.

DETAILED DESCRIPTION OF ONE OR MORE EMBODIMENTS

Figure 4A:
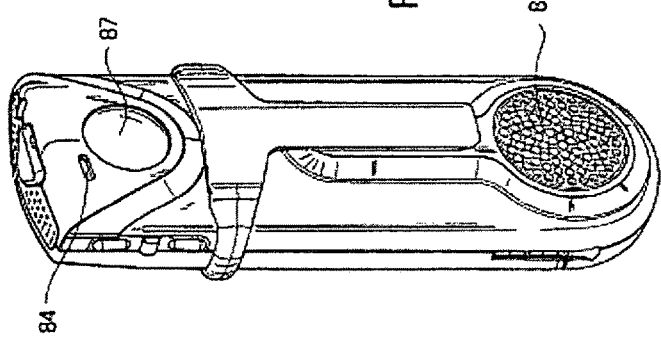
FIG. 4A depicts an example of each Badge (B1, B2, . . . , B5) shown in FIG. 1.

The system and method for homonym treatment is particularly applicable to any speech recognition system in which it is desirable to be able to differentiate between a large number of names that are similar or are homonyms of each other. For example, the system and method for homonym treatment in speech recognition that may be used in a voice-controlled wireless communications system that uses wireless access points based on an IEEE 802.11 protocol and an Ethernet wired computer network to provide the network infrastructure for the communications system where the voice-controlled wireless communication system uses speech recognition to identify a user name and, for purposes of illustration, it is in this context that the system and method are described. It will be appreciated by those skilled in the art, however, that the system and method for homonym treatment in speech recognition has greater utility, since it can be used with/implemented to provide this capability for various speech recognition engines in various other embodiments, so that it may be applicable to other speech recognition systems where it is desirable to provide homonym treatment. For illustration purposes, a voice controlled wireless system that may utilize the system and method for homonym treatment in speech recognition is now described.

FIG. 1 illustrates an example of a voice-controlled wireless communications system 30 that may utilize a homonym treatment unit. In particular, the system comprises a plurality of wireless communication devices referred to as Badges 32 (marked B1-B5 in this example), one or more wireless access points 34 (marked AP) and one or more central computers referred to as controlling computers 36 (marked VS), as shown. The access points 34 in FIG. 1 may be standard off-the-shelf wireless access points, such as a standard 802.11 access point in one embodiment, which collectively implement a wireless network allowing the Badges 32 to communicate with other components of the communications system 30. The access points 34 communicate with each other, and with the controlling computer 36, over a computer network 38 which may be a local area Ethernet network in one embodiment. Taken together, the access points 34 and the computer network 38 provide the network infrastructure for the wireless communications system 30. Any of the controlling computers 36 may also be interfaced to a telephone system such as a Private Branch Exchange (PBX) system 39, which allows the wireless communications system 30 to communicate with common telephone communication systems. Each Badge 32 is a wireless communications device that is capable of communicating with an access point 34, and therefore is also capable of communicating with the controlling computer 36 in order to implement the desired wireless communication functions. Each Badge 32 serves as one of the primary communications endpoints of the system.

FIG. 2 is a block diagram of an exemplary controlling computer 36. The controlling computer 36 is responsible for the overall control of the system. In one embodiment, the controlling computer 36 may be a typical off-the-shelf computer system, such as a typical server computer, the hardware details of which are well known. In more detail, the central computer 36 may include a central processing unit (CPU) 124 and a persistent storage device 128, such as a hard disk drive, an optical drive, a flash memory or the like. The controlling computer may also have telephony interface hardware 134 that permits the controlling computer to interface to a telephone and/or Public Branch Exchange (PBX) system 39, and a computer network interface 132, such as the Ethernet interface shown, that permits the controlling computer to connect to the computer network. In addition, the controlling computer 36 must have a memory 126 that stores software currently being executed by the CPU 124. This software includes at a minimum an operating system 122, application software 120 to implement the wireless communication functions of the wireless communications system, and a database 130 to store information associated with the wireless communications system. This database information includes but is not limited to a grammar database 260 that is part of the system into which name information, disambiguation information and homonym information from the system and method for homonym treatment are stored as described below in more detail.

The database 130 stores user information, including the assignment of users to devices, speech files containing user name prompts and voice signatures, user preferences and so forth. It also keeps track of the whereabouts of users as they roam within the communications network. In large corporate installations, this component may interface to global employee databases maintained by the customer. Some information fields in database 130, for each user of the system, may include but are not limited to the following: user name, login name, password, alternative name/identifier, phone number and address, voicemail greeting message, ring tone, caller identifier status (on/off), buddy list, block list of calls to block, message forwarding service status (on/off and if on, to what number), distribution groups (e.g. "Memory Marketing Team"), saved messages, and device serial number.

FIG. 3 illustrates more details of the application software 120. In one embodiment, the application software comprising one or more portions of code wherein each portion of the code has a plurality of lines of computer instructions that implement the operations and functions described below. The software may include a voice command interpreter 140, a call manager 142, a connection manager 144, and an administrator 146 that are interconnected together and exchange commands and data with each other as shown. The voice command interpreter 140 has responsibility for interpreting and executing voice-based commands received from the Badges. The call manager 142 has responsibility for the set-up and the breakdown of two-party and multi-party calls (including external calls) and maintaining status information associated with these calls. The connection manager 144 is the component that is responsible for managing access points and the connections among Badges and access points. It also supports a hand-off from one access point to another as a Badge roams about the network. The administrator module 146 supports administrator-level and user-level configuration and monitoring of the system through a web browser interface as shown.

As an example of the use of the system above, suppose a person wearing a Badge wants to speak to Maria Bettini, who is also wearing a Badge. The person initiating the communication presses a button on the Badge, receives an audible prompt, and then utters the command "Call Maria Bettini." The Badge digitizes this utterance and transmits it as data packets over the wireless network to the controlling computer. A speech recognition engine in the controlling computer (described in more detail with reference to FIG. 5) associates the argument in the command (Maria Bettini) with a user in the configuration database, and the controlling computer then establishes communication between the Badge of the person who initiated the call and Maria Bettini's Badge. After establishing the communication session, the controlling computer drops out of the process, the two Badges communicate directly with each other over the wireless net, and no additional speech recognition is performed.

In one embodiment, a person wearing the Badge can utter a command that comprises a verb and an argument. The verb specifies the action that the person initiating the communication wants to perform with the Badge. Examples of verbs include "Call," "Send a message to," and "Broadcast to." The system defines a static set of verbs; that is, the available verbs are the same at every customer installation. The argument specifies the name of a Badge user (such as "Maria Bettini"), a group of Badge users (such as "Fifth Floor Nurses"), or an address book entry (a person or place that does not have a Badge, but whose name and phone number are entered in the customer configuration database, such as "Poison Control"). The set of possible arguments is specified in the customer configuration database and is dynamic—that is, the database entries differ at every customer installation, and users at customer installations can add and remove database entries continually. Because the set of arguments contains not just Badge users but also groups of Badge users and outside entities, the number of possible arguments can be quite large. Together, the entire set of words and phrases the system can recognize—the set of verbs and arguments—composes the recognition space.

Figure 4B:
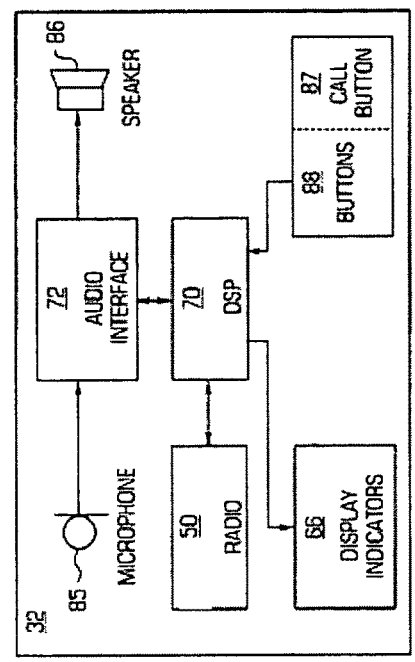
FIG. 4B depicts a block diagram illustrating the hardware components of the Badge shown in FIG. 4A.

FIG. 4A illustrates one embodiment of the communications Badge 32, and FIG. 4B is a block diagram illustrating the hardware components of the Badge 32. In one embodiment, each Badge 32 is a portable, battery-powered, wireless device that supports hands-free, full duplex voice communications using a small microphone 85 (mounted behind microphone port 84) and a speaker 86. The Badges are sufficiently small and lightweight enough that they may be clipped onto a shirt pocket of the user or may be worn on a lanyard around the neck of a user. Each Badge 32 has a Digital Signal Processor (DSP) 70 that serves as a programmable controller of all other Badge hardware. The DSP 70 may include a processor and memory that stores the software resident on each Badge. The DSP 70 is interfaced to a radio 50 for communication with the communication system's access points. The DSP is interfaced to the microphone 85 and the speaker 86 through an audio interface 72. The DSP is also interfaced to various display indicators 66 and to various buttons 88 including a "Call Button" 87, which is generally used to initiate communications sessions. Further details about the Badge 32 are provided in commonly owned U.S. Pat. No. 6,901,255 issued on May 31, 2005 which is incorporated herein by reference.

Figure 5A:
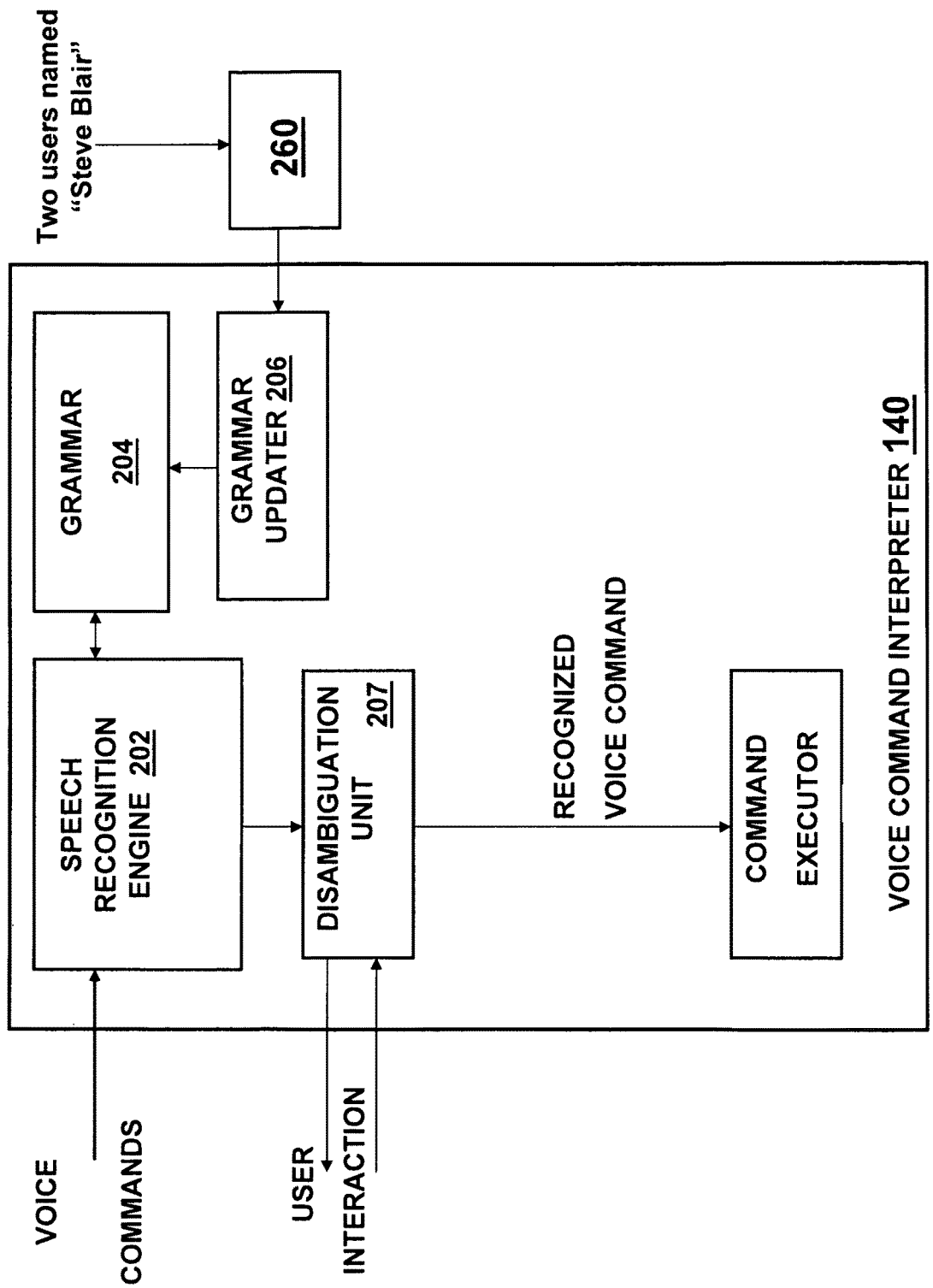
FIG. 5A depicts a block diagram illustrating more details of one embodiment of the voice command interpreter shown in FIG. 3.
Figure 5B:
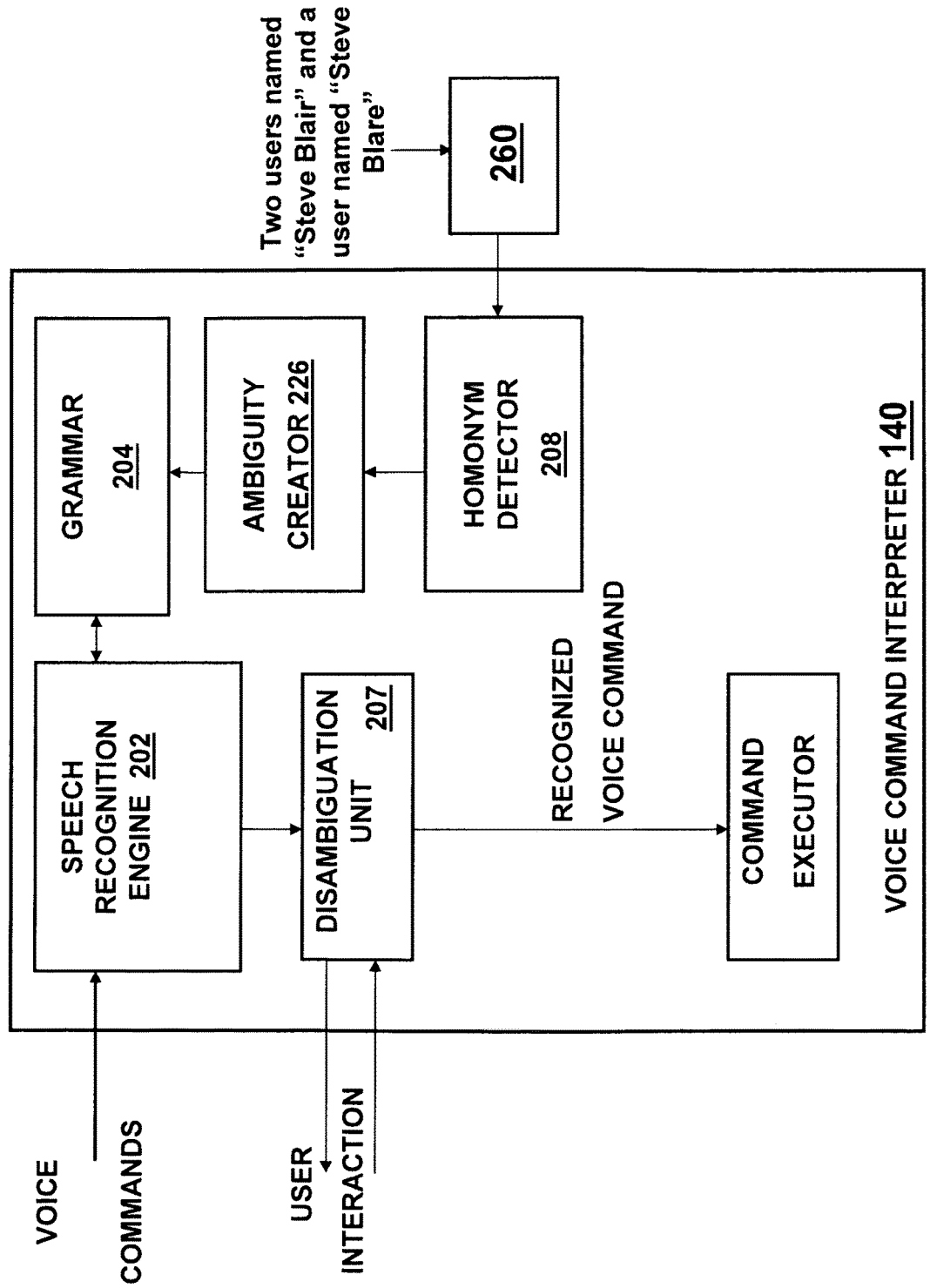
FIG. 5B depicts a block diagram illustrating more details of another embodiment of the voice command interpreter shown in FIG. 3.

FIG. 5A depicts a block diagram illustrating more details of a first embodiment of the voice command interpreter 140 shown in FIG. 3. More generally, the system and method for homonym treatment may be implemented in any speech recognition system and the exemplary implementation shown in FIGS. 5A and 5B are for illustration purposes. The elements of the voice command interpreter 140 shown in FIG. 5A, in one embodiment, may be implemented as one or more pieces of software/code (a plurality of lines of computer code) being stored on a storage device and executed by a processing unit. Similarly, the elements of the homonym treatment unit (which are shown as part of the voice command interpreter 140 in the exemplary implementations shown in FIGS. 5A and 5B) may be implemented, in one embodiment in software, but may also be implemented in hardware (such as a programmed hardware device) or a combination of hardware and software.

Returning to FIG. 5A, the voice command interpreter 140 may include a speech recognition engine 202 that may be a commercially available Nuance Inc. speech recognition engine implemented in software, that performs speech recognition of the voice commands. The speech recognition engine may also have a well known voice prompt unit (not shown that may be implemented in software) associated with the speech recognition engine that generates a voice prompt that can be communicated to the user who speaks the voice command. For example, the voice prompt unit may query the user to identify the correct name as is described below in more detail. In operation, the speech recognition engine receives information/data from a grammar unit 204 that retrieves/stores one or more pieces of grammar data in the grammar database 260. The grammar provided by the grammar unit to the speech recognition engine 202 is used to parse the voice commands from the user and recognize the verb portion of the voice command and an argument portion (such as "Call Steve Blair" in which "Call" is the verb portion and "Steve Blair" is the argument portion on which the command is being performed) and then the other parts of the system perform the required action.

The grammar contains an entry for each user consisting of, at a minimum, the spelling of the user's spoken name as it is entered in the database 260 and the user's unique identifier which interprets the name by associating it with an entry in the database. The grammar is ambiguous when the spoken names of the two or more entries have the same spelling but different interpretations (different unique identifiers). A typical speech recognition engine may have trouble interpreting spoken words, such as spoken names, when an ambiguity occurs. For example, the grammar may contain two users who have the spoken name "Steve Blair" but, for example, work in different departments, such as one user is in the nursing department and one user is in the radiology department and it is important for the speech recognition engine to be able to distinguish between the two users so that the speech recognition engine can properly recognize the correct argument portion and then execute the voice command (using the command executor which may also be implemented in software). This problem is particularly acute when the speech recognition engine is being used for a system with a large number of users in which identical names are more likely to occur. FIG. 7 illustrates an example of a typical speech recognition engine grammar in which the speech recognition engine is unable to distinguish between the two users. In FIG. 7, the unique identifiers u-sblair0 and u-sblair refer to two different users in the database. However, the corresponding user names that must be differentiated by the speech recognition engine when interpreting a voice command are ambiguous because each user has an identical "(steve blair)" spoken name in the grammar. The speech recognition engine cannot resolve this ambiguity because there is no additional way to distinguish these users.

To address these problems with typical speech recognition engines, the voice command interpreter 140 (or more generally any speech recognition engine) may further include a grammar updater 206 and a disambiguation unit 207 that are associated with and interact with the speech recognition engine. The grammar updater 206 and the disambiguation unit 207 each may be implemented as one or more lines of software code that is executed by the computer on which the voice command interpreter 140 is running. The grammar updater 206 locates identical names in the system and uses the database 260 to generate alternate spoken names (a disambiguator) that are stored in the database 260 and that allow the speech recognition engine 202 to unambiguously identify each user in the system (sometimes by having the user who issues the command specify details about the user who is being called, such as that user's work group as described below in more detail). An example of the alternate spoken names stored in the grammar is shown in FIG. 8. In FIG. 8, the user u-sblair0 has the alternate spoken names "(steve in radiology)" and "(steve blair in radiology)" that allow disambiguation from u-sblair, which has the alternate spoken names "(steve in nursing)" and "(steve blair in nursing)".

After the alternate spoken names or other disambiguator are stored in the grammar, the speech recognition engine 202 receives a voice command ("Call Steve Blair") and tries to identify the argument portion of the voice command. In the example, the argument portion is "Steve Blair" and the grammar indicates that the system has two different "Steve Blair" entries as shown in FIG. 8. To allow the disambiguation unit 207 to resolve this ambiguity, the grammar updater 206 inserted additional phrases into the grammar ("in radiology" or "in nursing" in one example in which the two users work in different departments). The speech recognition engine, upon recognizing the spoken name Steve Blair, detects that there are two interpretations, and submits that information to the application software 120. The application software 120 then uses this information to initiate the disambiguation unit 207, which asks the user who initiated the call which of the two users was intended. For example, the disambiguation unit 207 can generate a voice prompt (such as "Do you mean Steve Blair in nursing or Steve Blair in radiology) to the user (user interaction) so that the user can identify the correct user and resolve the ambiguity so that the recognized voice command is executed by the command executor.

FIG. 5B depicts a block diagram illustrating more details of a second embodiment of the voice command interpreter 140 shown in FIG. 3 that has similar elements as those shown in FIG. 5A and those elements will not be described again for this figure, but have the same characteristics as those described with respect to FIG. 5A. Another problem associated with a typical speech recognition engine is distinguishing between two or more words, such as user names for example, that are homonyms. For example, if two users have names "Steve Blair" and another user has the name "Steve Blare" (different users but with last names that are homonyms of each other), it is important for the speech recognition engine to be able to distinguish between these users. FIG. 9 illustrates an example of the grammar in which homonym names ("Steve Blair" and "Steve Blare") are not ambiguous, but which still results in the typical speech recognition engine being unable to properly recognize a voice command. If a user issues the command "Call Steve Blare" and the typical speech recognition engine uses the grammar in FIG. 9 to interpret the command, the speech recognition engine will either choose "Steve Blair" and trigger the disambiguation routine between Steve Blair in Nursing and Steve Blair in Radiology, or the speech recognition engine will choose Steve Blare. Because the grammar does not identify a homonym as an ambiguity, the speech recognition engine never calls a disambiguation routine that allows the user who issued the command to choose between the three possible names that sound the same. To resolve this additional problem of typical speech recognition engines, the voice command interpreter 140 may further include a homonym detector 208 that may be implemented as one or more lines of software code that is executed by the computer on which the voice command interpreter 140 is running. The homonym detector unit 208 identifies similar sounding names (homonyms) in the system and then an ambiguity creator 226 to create an artificial ambiguity (which is then stored in the grammar database 260) that allows the speech recognition engine 202 to differentiate between the homonym names of the user as described in more detail below. In combination, the grammar updater 206 and the ambiguity creator 226 allows the speech recognition engine to disambiguate names in the system and successfully differentiate between homonym words, such as homonym names for example, so that voice commands are recognized.

As shown in FIG. 10, the ambiguity creator 226 has added "(steve blair)" as a grammar entry for the user u-sblare, creating an artificial ambiguity with both u-sblair0 and u-sblair. Similarly, the ambiguity creator 226 has added "(steve blare)" as a grammar entry for the users u-sblair0 and u-sblair, creating an artificial ambiguity with u-sblare. This information in the grammar allows the speech recognition engine to recognize a voice command even when the argument contains a name that has a homonym in user database. Thus, when the voice command "Call Steve Blare" is received by the speech recognition engine, due to the homonym information inserted into the grammar as shown in FIG. 10, the speech recognition engine is able to execute the disambiguation unit 207 (generate a voice prompt and receive a user response as user interactions) and then correctly identify the user 'Steve Blare'.

In another embodiment, the voice command interpreter 140 may include both the grammar updater 206 and the ambiguity creator 226 together wherein each unit inserts information into the grammar. Thus, the speech recognition engine, based on the grammar information from the grammar updater and the homonym information inserted into the grammar, is able to properly uniquely identify each user and also distinguish between the homonym names (based in part on responses to voice prompts) to perform the proper command, such as "Call", on the proper user "Steve Blair in nursing" whereas other speech recognition engines would be unable to differentiate between the similar sounding names.

Figure 6:
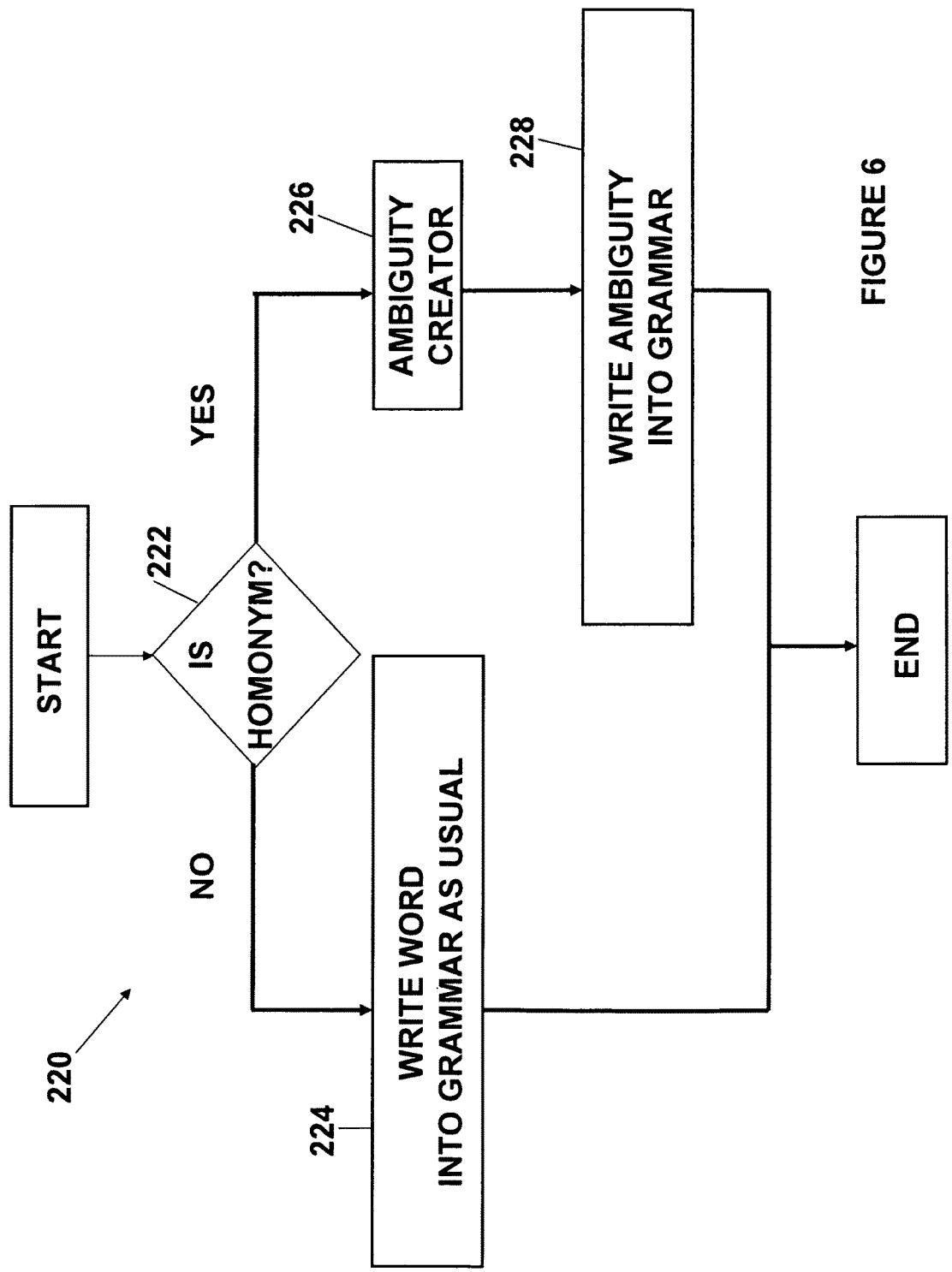
FIG. 6 illustrates a homonym treatment method performed by the homonym detection unit combined with the ambiguity creator, both of which are shown in FIG. 5B.

FIG. 6 illustrates a homonym treatment method 220 performed by the homonym detection unit 208 combined with the ambiguity creator 226 both of which are shown in FIG. 5B. The method starts by determining if any words in the existing grammar are homonyms (222) and if they are, creates an artificial ambiguity in the grammar (226) using the ambiguity creator as described below in more detail. The detection of the homonyms can be performed at any time and does not need to be carried out when the speech recognition engine is attempting to recognize a voice command. In one embodiment, the homonym detection may be performed by the publicly available Metaphone algorithm (implemented as a plurality of lines of computer code). The homonym detector may also be performed using the publicly available Soundex algorithm, the publicly available Double Metaphone algorithm or any other algorithm that can detect/identify similar sounding words programmatically. In the homonym detection process, a sound similarity identifier for each word/name is determined so that words/names with similar sound similarity identifier can be identified. Then, words that have the same sound similarity identifier are identified as homonyms. Alternatively, the homonym detection may be accomplished by taking a sufficiently large set of words, such as names in an existing customer database, and manually comparing them to identify homonyms. To reduce the labor in the manual comparing, an algorithm may be used to scan the database that is known to generate too many possible homonyms and the resultant list can then be manually reviewed. In fact, any technique may be used to detect the homonyms.

Returning to FIG. 6, the artificial ambiguity that is inserted into the grammar (228) may be known as an ambiguator and may be the spelling of the spoken name that creates the ambiguity as shown in FIG. 10 but it may also be other information that creates the ambiguity. In the example shown in FIG. 10, the ambiguity is the spelling of the spoken name. The artificial ambiguity inserted into the grammar causes the disambiguation unit 207 of the voice command interpreter 140 to be activated when that particular word is used as an argument in a voice command. Thus, the ambiguity creator ensures that the disambiguation unit is executed for the names that are homonyms which ensures that the voice command interpreter (and the speech recognition engine) can properly recognize the voice command.

The grammar must also contain disambiguation information that allows the artificial ambiguity to be resolved by the disambiguation unit. The disambiguation information may be a phrase in the grammar as shown in FIG. 10 but it may also be other information that allows the disambiguation. As another example, the disambiguator may be the spelling of each word that allows the speech recognition engine 202 to unambiguously identify each user in the system (such as by asking the user "Do you mean Steven with a 'v' or Stephen with a 'ph'".)

If the particular word being analyzed is not a homonym of another word in the grammar, the word is written into the grammar as usual (224) and the homonym detection for that word is completed. If the word is identified as having a homonym, then an ambiguity creation process (226) occurs in which information is added into the grammar (228) that causes the disambiguation routine of the voice command interpreter to occur when that particular word is used as an argument in a voice command. Thus, the ambiguity creator ensures that the disambiguation routine unit is executed for the names that are homonyms which ensures that the voice command interpreter (and the speech recognition engine) can properly recognize the voice command.

The above example implementation was described with respect to ambiguous names and homonym names in a voice recognition system. However, the homonym treatment technique may be used to help a voice recognition system interpret any word that has a homonym and is thus not only applicable to the interpretation of names.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A speech recognition system, comprising:
a voice command interpreter having a speech recognition engine and one or more pieces of grammar associated with the speech recognition engine wherein the one or more pieces of grammar contains a word and an artificial ambiguity about one or more homonyms for the word that are inserted into the one or more pieces of grammar of the speech recognition engine for the word to create an ambiguity between the word and the one or more homonyms; and
the voice command interpreter identifies a correct interpretation for a received word that has the one or more homonyms based on the received word and the one or more pieces of grammar for the word that includes the inserted information about the one or more homonyms.

2. The system of claim 1, wherein the voice command interpreter further comprises a disambiguation unit that is triggered by the ambiguity between the received word and the one or more homonyms wherein the disambiguation unit generates a voice prompt to a user with information about each of the one or more homonyms to identify the correct interpretation for the received word.

3. The system of claim 2, wherein the received word is a name.

4. The system of claim 1, wherein the one or more pieces of grammar associated with the speech recognition engine further comprises a first word and a second word that cannot be distinguished and wherein the first word and the second word each have a piece of information that allows the voice command interpreter to identify a correct interpretation for a received word that can be the first word or the second word based in the piece of information for the first word and the second word.

5. The system of claim 4, wherein the voice command interpreter further comprises a disambiguation unit that is triggered by the ambiguity between the first word and the second word wherein the disambiguation unit generates a voice prompt to a user with each of the first word and the second word and the piece of information associated with the first word and the second word to identify the correct interpretation for the received word.

6. The system of claim 5, wherein the piece of information associated with the first and second words further comprises a phrase that disambiguates the first word from the second word.

7. The system of claim 5, wherein the piece of information associated with the first and second words further comprises a spelling that disambiguates the first word from the second word.

8. The system of claim 5, wherein the word is a name.

9. The system of claim 1 further comprising a wireless communication system that incorporates the voice command interpreter wherein a voice command from a user in the wireless communication system is interpreted by the voice command interpreter.

10. The system of claim 1 further comprising a grammar database that stores the one or more pieces of grammar.

11. The system of claim 1 further comprising a homonym detection unit that detects if a word in the one or more pieces of grammar associated with the speech recognition engine has one or more homonyms.

12. The system of claim 11, wherein the homonym detection unit further comprises a plurality of line of computer code executed by a processing unit associated with the speech recognition system.

13. A method for speech recognition, comprising:
inserting an artificial ambiguity about one or more homonyms for the word into the grammar of a speech recognition engine for the word to create an ambiguity between the word and the one or more homonyms;
receiving a voice command containing at least one word; and
identifying a correct interpretation for the at least one word based on the at least one word in the voice command and the grammar for the word that includes the inserted information about the one or more homonyms.

14. The method of claim 13, wherein identifying a correct interpretation further comprises triggering a disambiguation unit due to the ambiguity between the one or more homonyms and generating a voice prompt to a user with information about each of the one or more homonyms to identify the correct interpretation for the received word.

15. The method of claim 14, wherein the received word is a name.

16. The method of claim 13, wherein the one or more pieces of grammar associated with the speech recognition engine further comprises a first word and a second word that cannot be distinguished and wherein the first word and the second word each have a piece of information that allows the voice command interpreter to identify a correct interpretation for a received word that can be the first word or second word based in the piece of information for the first word and the second word.

17. The method of claim 16, wherein identifying a correct interpretation further comprises triggering a disambiguation unit that is triggered by the ambiguity between the first word and the second word and generating a voice prompt to a user with each of the first word and the second word and the piece of information associated with the first word and the second word to identify the correct interpretation for the received word.

18. The method of claim 17, wherein the piece of information associated with the first word and the second word further comprises a phrase that disambiguates the first word from the second word.

19. The method of claim 17, wherein the piece of information associated with the first word and the second word further comprises a spelling that disambiguates the first word from the second word.

20. The method of claim 17, wherein the word is a name.

21. The method of claim 13 further comprising providing a grammar database that stores the one or more pieces of grammar.

22. The method of claim 13 further comprising detecting if a word in the one or more pieces of grammar associated with the speech recognition engine has one or more homonyms.

23. A voice controlled wireless communications system, comprising:
   a central computing device unit;
   one or more concentrators coupled to the central computing device unit over a link wherein each network concentrator communicates with the central computing device unit, each network concentrator having a coverage range;
   a plurality of wireless devices that wirelessly communicate with a network concentrator when the wireless device is in the coverage range of the network concentrator; and
   the central computing device unit further comprising a voice command interpreter having a speech recognition engine and one or more pieces of grammar associated with the speech recognition engine wherein the one or more pieces of grammar contains a word and an artificial ambiguity about one or more homonyms for the word that are inserted into the one or more pieces of grammar of the speech recognition engine for the word to create an ambiguity between the word and the one or more homonyms; and
   the voice command interpreter identifies a correct interpretation for a received word that has the one or more homonyms based on the received word and the one or more pieces of grammar for the word that includes the inserted information about the one or more homonyms.

24. The system of claim 23, wherein the voice command interpreter further comprises a disambiguation unit that is triggered by the ambiguity between the one or more homonyms wherein the disambiguation unit generates a voice prompt to a user with information about each of the one or more homonyms to identify the correct interpretation for the received word.

25. The system of claim 24, wherein the received word is a name.

26. The system of claim 23, wherein the one or more pieces of grammar associated with the speech recognition engine further comprises a first word and a second word that cannot be distinguished and wherein the first word and the second word each have a piece of information that allows the voice command interpreter to identify a correct interpretation for a received word that can be the first word and the second word based in the piece of information for the first word and the second word.

27. The system of claim 26, wherein the voice command interpreter further comprises a disambiguation unit that is triggered by the ambiguity between the first word and the second word wherein the disambiguation unit generates a voice prompt to a user with each of the first word and the second word and the piece of information associated with the first word and the second word to identify the correct interpretation for the received word.

28. The system of claim 27, wherein the piece of information associated with the first word and the second word further comprises a phrase that disambiguates the first word from the second word.

29. The system of claim 27, wherein the piece of information associated with the first word and the second word further comprises a spelling that disambiguates the first word from the second word.

30. The system of claim 27, wherein the word is a name.

31. The system of claim 23 further comprising a grammar database that stores the one or more pieces of grammar.

32. The system of claim 23 further comprising a homonym detection unit that detects if a word in the one or more pieces of grammar associated with the speech recognition engine has one or more homonyms.

33. The system of claim 32, wherein the homonym detection unit further comprises a plurality of line of computer code executed by a processing unit associated with the speech recognition system.

* * * * *